United States Patent [19]
Konrad

[11] 3,855,512
[45] Dec. 17, 1974

[54] BRAKING-MODE DETECTION CIRCUIT
[75] Inventor: Charles Edward Konrad, Roanoke, Va.
[73] Assignee: General Electric Company, Salem, Va.
[22] Filed: June 11, 1973
[21] Appl. No.: 368,973

[52] U.S. Cl. .............................. 318/366, 318/139
[51] Int. Cl. ............................................. H02p 3/08
[58] Field of Search .................. 318/269, 366–369, 318/375, 139, 364, 365

[56] References Cited
UNITED STATES PATENTS
3,297,930   1/1967   Payne ............................. 318/269
3,636,422   1/1972   Miller et al. ................. 318/269 X
3,777,237   12/1973  Anderson ....................... 318/375 X Primary Examiner—James R. Scott
Assistant Examiner—W. E. Duncanson, Jr.
Attorney, Agent, or Firm—James H. Beusse; Harold H. Green, Jr.

[57] ABSTRACT

Means for detecting operation of a direct-current motor in the reversed or braking mode. Means are provided for receiving signals representative of armature current and of the mark-space conduction ratio of a motor control thyristor A rise in motor current above a predetermined value, coupled with a decline in mark-space ratio below a predetermined value, causes the disclosed circuit to produce an output signal which is utilized to temporarily limit conduction of the motor control thyristor and procure controlled deceleration.

19 Claims, 5 Drawing Figures

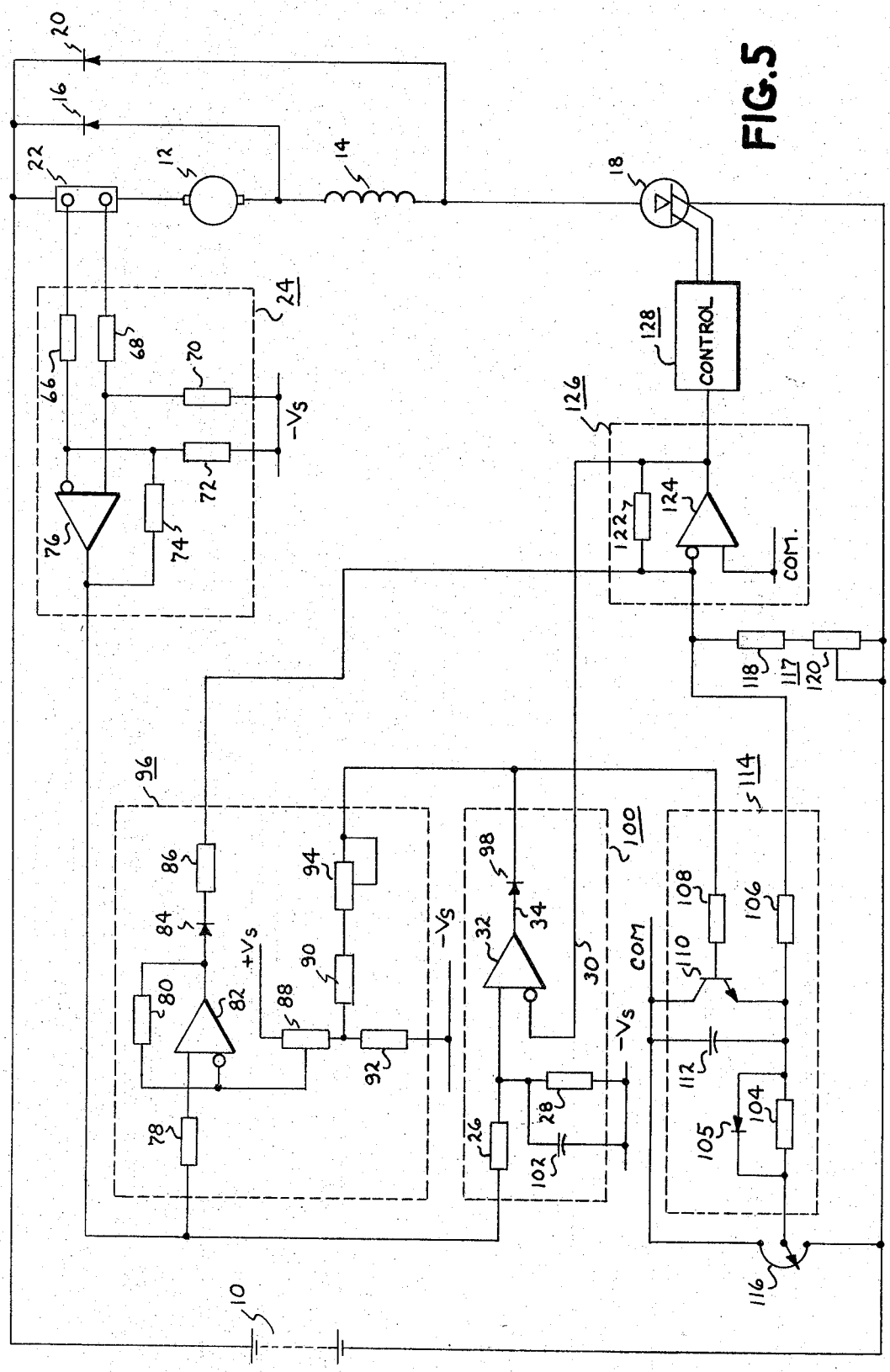

BRAKING-MODE DETECTION CIRCUIT

BACKGROUND OF THE INVENTION

The present invention relates generally to a control circuit for the regulation of braking torque in a direct current motor drive system and, more particularly, to a circuit for the detection of motor operation in the braking mode.

It is known in the prior art that the power supplied to a direct current motor from a source of direct current potential may be controlled by regulating the percentage of time in which the motor and source are interconnected. Power circuits of this type are categorized as time-ratio control circuits, a name which stems from the switching nature of the power control device that connects the power source and load together for a given ratio of the total time. This time ratio, or ratio of conducting to non-conducting time, is commonly called the mark-space ratio. A time-ratio control circuit of this type, particularly adaptable to the control of electric vehicles, is described in U.S. Pat. No. 3,656,039 by C. E. Konrad and assigned to the assignee of the present invention.

When this form of control is applied to an electric vehicle a series power circuit is formed by the direct current source, the motor, and a power switching device such as a power transistor or a thyristor circuit employing a main thyristor and the required commutating elements. The motor field winding is connected in a bridge arrangement to provide directional control of the field magnetic flux with respect to the flux generated by the armature current, and a power diode is conventionally connected in parallel to the armature circuit with the diode poled to provide a conductive path during braking operation. The series combination of the motor armature and field winding is also shunted by a second power diode to provide a path for the continuation of reactive motor current flow during the non-conductive periods of the power switching device.

When the system is operating in the drive mode, the flux produced by current flowing in the motor field winding results in a generated armature voltage of a polarity which inhibits current flow through the diode that shorts the armature. When a retarding torque is required, the direction of the field flux is reversed by energizing contactors which reverse the direction of current flow in the field winding. This reversal in the direction of field flux results in a generated armature voltage polarity that is short-circuited by the armature diode. The motor then functions as a shunt excited generator, producing a dynamic braking torque whose magnitude is regulated through control of the power switch mark-space ratio.

When the motor operates in the braking mode, it is desirable to regulate motor torque to provide smooth deceleration independent of the accelerator pedal position. This has been accomplished in prior controls through the use of armature current feedback. Two parameters are necessary to implement this form of deceleration control; the control must be provided, firstly, with a signal which indicates that the motor is operating in a braking mode; and secondly, with a signal indicative of armature current. In the prior art, both of these signals have been derived from the armature circuit, and are dependent to some degree upon the dynamic resistance of the armature diode. A control of this type is described in U.S. Pat. No. 3,344,328 by H. E. Morris, assigned to the assignee of the present invention. While this form of control has been found acceptable in many applications, the dependence of the braking signals upon the armature diode characteristics leads to variations in braking performance with changes in temperature since the dynamic resistance of power diodes is temperature dependent.

It is therefore an object of the present invention to provide an improved control circuit for regulating the decelerating torque of a direct current motor drive system.

A further object is to provide an improved circuit for detecting that a motor is operating in a braking mode.

A still further object of the invention is to provide a deceleration control circuit for a direct current motor which is insensitive to variations in the characteristics of an armature shunting diode.

SUMMARY OF THE INVENTION

Briefly stated, in accordance with one aspect of the invention the foregoing objects are achieved by providing means for sensing the mark-space ratio of a power switching device used to control power flow to the motor, and for sensing the magnitude of current flow through the motor armature. Upon the detection of both a motor current above a predetermined value and a mark-space ratio below another predetermined value, further control means operate to limit the mark-space ratio to a value which procures controlled deceleration of the motor.

In a further embodiment of the invention additional means are provided to limit the mark-space ratio in response to undesirably high current flow through the armature in either the braking or drive modes.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

FIG. 5 is a schematic drawing of a motor control circuit illustrating the use of a preferred embodiment in a drive system.

DESCRIPTION OF THE PREFERRED EMBODIMENT

Figure 1:
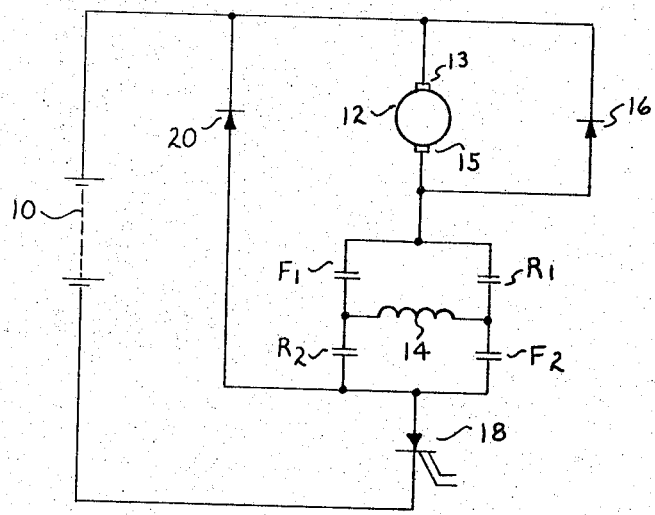
FIG. 1 is a simplified schematic of a series-connected direct current motor.

Referring now to FIG. 1, there is shown a suitable source of direct current power 10 illustrated as a battery with its positive terminal at the top and its negative terminal at the bottom. A series direct current motor having an armature 12, brushes 13 and 15 and a field winding 14 is connected directly to the positive terminal of the battery 10. A reversely poled diode 16 is connected between the positive terminal of battery 10 and the junction of armature 12 and field winding 14.

Field winding 14 is connected in a bridge arrangement with forward contactors $F_1$, $F_2$ and reversing contactors $R_1$, $R_2$. By closing either $F_1$ and $F_2$, or $R_1$ and $R_2$ the direction of current flow through field winding 14 may be varied to produce motor rotation in a desired direction, or to effect braking.

When the motor is rotating in the forward direction, the direction of the field magnetic flux is such that the generated armature voltage is positive at the top brush 13 providing a reverse bias on diode 16 and opposing the voltage supplied by the battery 10. When the reversing contactors are closed so that field current flows in the reverse direction the polarity of the generated armature voltage is reversed, that is, becomes positive at the lower brush 15. This reversal in the polarity of the generated armature voltage forward biases diode 16, effectively short-circuiting the armature so that a reverse current of substantial magnitude flows through the armature windings. Thus while the motor is still turning in the same direction physically, its effective or electrical direction has been reversed.

The motor is connected to the negative terminal of battery 10 through a power switch 18, illustrated as a thyristor having a gating terminal, which is pulsed to close the switch. The opening of the switch, or deenergization of the thyristor, can be implemented by commutating circuitry well known to those skilled in the art or by utilizing a gate turn-off thyristor, also well known in the art.

If the switch 18 is closed for an interval $t_1$ and opened for an interval $t_2$, the average voltage $V_M$ applied to the motor terminals is then $$V_M = [t_1/t_1 + t_2]V_B$$

where $V_B$ is the voltage of the battery 10. It can be seen then that the motor terminal voltage can be adjusted between zero and the full battery voltage $V_B$ by suitable control of the ratio of time interval $t_1$ to the sum of the intervals $(t_1 + t_2)$, this ratio being termed the mark-space ratio.

A diode 20 having its cathode connected to the top brush 13 of armature 12, and its anode connected to the junction between the power switch 18 and field winding 14, provides a path for the reactive motor current during the period that the power switch 18 is open.

Figure 2:
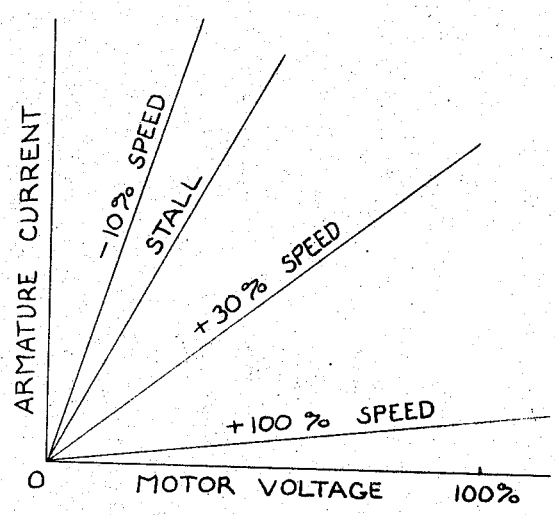
FIG. 2 is a representation of the volt-ampere characteristics exhibited by the motor of FIG. 1 under various operating conditions.

The curves of FIG. 2 illustrate volt-ampere characteristics of a typical DC series traction motor under various operating conditions. The vertical axis represents motor current and the horizontal axis represents motor voltage, but since the motor voltage is directly proportional to the mark-space ratio, the horizontal axis is scaled directly in terms of the mark-space ratio which ranges in value from zero to unity. When the motor is operating at 100 percent speed in the positive direction as previously defined, maximum voltage results in rated motor current. At 30 percent speed, maximum voltage produces 6 times the rated current level while at stall, 40 percent of battery voltage is sufficient to develop 6 times the rated motor current. If the reversing contactors are closed so that the motor is rotating in an electrically negative direction at −10 percent of maximum speed, only 25 percent of battery voltage is necessary to develop 6 times rated motor current. When the speed of rotation in the backward direction is greater than −10 percent, correspondingly lesser percentages of battery voltage are required to develop 6 times rated armature current.

When the motor is rotating in an electrically negative direction at speeds of −10 percent or more, the motor is considered to be operating in the braking mode and it is in this region that the armature shunting diode 16 will be conductive. The slope of the motor volt-ampere characteristics is indicative of the motor speed and, in particular, a slope in excess of a predetermined value is indicative of motor operation in the braking region. Since the motor terminal voltage and the mark-space ratio are related by a constant of proportionality, the mark-space ratio can be used in conjunction with the armature current to detect motor operation in the braking mode.

Figure 3:
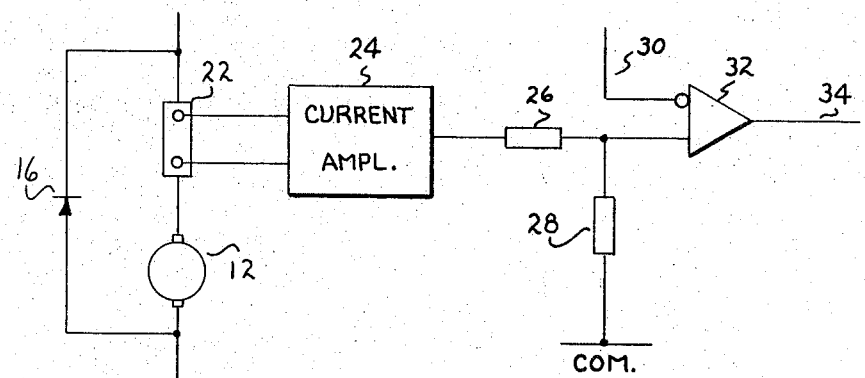
FIG. 3 is a schematic drawing illustrating one embodiment of the present invention.

Referring now to FIG. 3, there is shown a preferred embodiment of the invention for detecting motor operation in a braking mode when the current exceeds a predetermined value for a given motor voltage. A current shunt 22 is connected in series with the motor armature 12 to provide a voltage signal proportional to the armature current. The signal thus obtained is amplified by a differential amplifier 24 to provide a voltage that is proportional to the current through the armature 12. The output of amplifier 24 is supplied through a resistor 26 to the non-inverting input of comparator 32. The non-inverting input of comparator 32 is also coupled to a point of common potential by resistor 28.

As will be understood by those skilled in the art, comparator 32 may be a differential amplifier of a type commonly available commercially and discussed at page 18 of the *Linear Integrated Circuit Amplifier Handbook*, edited by J. N. Giles, published by the Fairchild Semiconductor Company and assigned Library of Congress No. 67-27446. Such a device has a pair of inputs, one termed "inverting" and the other termed "non-inverting". When the voltage applied to the non-inverting terminal is more positive than that applied to the inverting terminal the output voltage of the amplifier is of a first value. When the voltage applied to the non-inverting terminal becomes lower than that appearing at the inverting terminal, the output of the amplifier changes to a second value which is lower than the first value. The voltage level of the amplifier output therefore indicates the relative values of the voltages appearing at the input terminals thereof.

The inverting input of comparator 32 is supplied with a voltage signal which is proportional to the mark-space ratio and hence the motor terminal voltage. The magnitudes of resistors 26 and 28 are chosen to provide a voltage at the non-inverting input of the comparator which, at a given armature of current (typically 6 times the rated current level) is equal in magnitude to the voltage supplied to the other, inverting input of the comparator when the mark-space ratio is 25 percent. By using these values as reference points for determining circuit element values, it is insured that any time armature current and mark-space ratio attain the predetermined proportionality the comparator output will change state. This occurs because comparator output is a function of the relative values of the signals applied to its input terminals.

It will now be understood that comparator 32 is adjusted to operate along a characteristic curve as shown in FIG. 2, the established proportionality of the sensed signals needed to trigger comparator 32 corresponding to the slope of the desired plugging curve, i.e. a curve having a slope in excess of that of the stall speed curve. The system thus operates as a function of motor drive mode regardless of the absolute values of current or mark-space ratio. When the motor is operating in the drive mode the voltage of the inverting input will exceed that of the non-inverting input and the output terminal 34 of comparator 32 will remain at its most negative voltage level. When the motor is operating in a braking mode, however, corresponding to a slope in excess of the stall or zero-speed slope, the voltage of the non-inverting input will exceed that of the inverting input as the result of a higher level of armature current and the voltage at output 34 of comparator 32 will remain at its most positive level. A positive output at output terminal 34 is thus indicative of motor operation in the braking mode.

Figure 4:
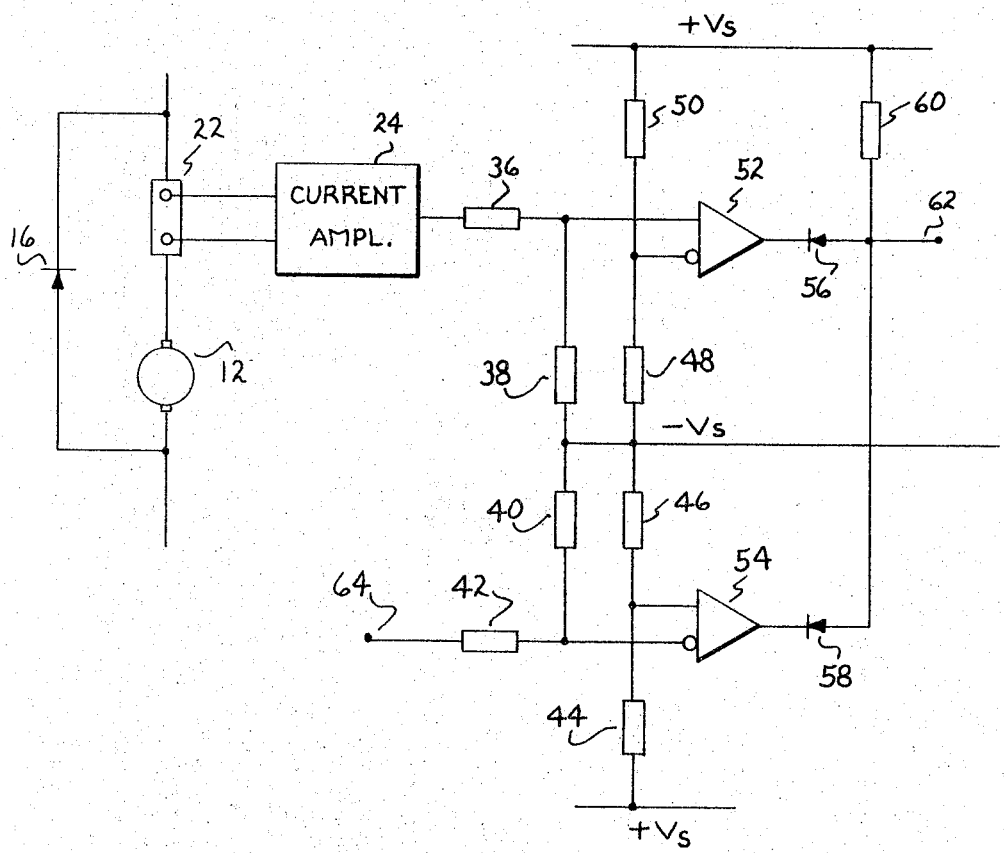
FIG. 4 is a schematic drawing illustrating a second embodiment of the invention.

Referring now to FIG. 4, there is shown a second embodiment of the invention which also provides a signal indicative of motor operation in the braking mode when the motor armature current magnitude is in excess of a predetermined value and the mark-space ratio is less than another, predetermined value. The inverting input of a comparator 52 is coupled to the junction of resistors 48 and 50 which are serially connected between the positive and negative supply busses. The non-inverting input of comparator 52 is connected to the junction of resistors 36 and 38 which are in turn serially connected between the negative bus and the output of the differential current amplifier 24. The non-inverting input of a second comparator 54 is connected to the junction between resistors 44 and 46 which are serially connected between the positive and negative busses. The inverting input of the comparator 54 is coupled to the junction of resistors 40 and 42 which are serially connected between an input terminal 64 and the negative bus.

The resistors 48 and 50 connected in series between the negative and positive busses form a voltage divider which biases the inverting input of comparator 52 at a selected voltage level, while the series connection of resistors 44 and 46 biases the non-inverting input of comparator 54 at a second voltage level. The magnitude of resistors 36 and 38 are chosen such that the voltage at the non-inverting input of comparator 52 will exceed the voltage level at the inverting input (determined by the magnitude of resistors 48 and 50) when the motor armature current is in excess of a selected level, typically 6 times the rated level of motor armature current. When the armature current is less than the selected level, the output voltage of comparator 52 will be at its most negative level, and when the current is in excess of the selected level, the output voltage will be at its most positive level.

A voltage proportional to the mark-space ratio is derived from control circuitry (not shown) and supplied to terminal 64; the magnitude of resistors 40 and 42 are chosen such that the inverting input will be at a voltage level which is less than that of the non-inverting input (determined by the magnitude of resistors 44 and 46) when the mark-space ratio is less than a predetermined value, typically 25 percent. When the mark-space ratio is less than the selected value the output voltage of comparator 54 will be at its most positive level; otherwise it will remain at its most negative level.

A pullup resistor 60 is connected between the positive bus and the output terminal 62 and a diode 56 is connected with its anode to terminal 62 and its cathode to the output of comparator 52. A second diode 58 is connected with its anode to terminal 62 and its cathode to the output of comparator 54. If the armature current level is less than the preselected level (advantageously 6 times rated motor current) or if the mark-space ratio is in excess of the preselected level (in one case 25 percent), the output of one of the two comparators will be negative and the voltage at the output terminal 62 will be negative. If the armature current is in excess of the preset level and the mark-space ratio is less than its preset level, the output voltage of both comparators will now be at a positive level, causing the voltage at output terminal 62 to also be positive, indicating motor operation in a braking mode.

Referring now to FIG. 5 there is shown in schematic form a complete circuit for the control of a direct current motor drive system employing a preferred embodiment of the invention. Elements common to the previously described figures have the same numbers. The power circuit comprising the battery 10, motor field 14 and armature 12, power switch 18, armature shunting diode 16, motor shunting diode 20, and current transducer 22 was described previously in conjunction with FIG. 1.

The differential current amplifier 24 employs an operational amplifier 76 connected as a differential amplifier in a manner well known in the art, and previously described in respect to comparator 32. The inverting input of the amplifier 76 is connected to the midpoint of resistors 66 and 72 which form a series circuit between a first terminal of current transducer 22 and the negative bus. The non-inverting input of the amplifier 76 is connected to the junction of resistors 68 and 70, which are serially connected between the second terminal of the current transducer 22 and the negative bus. A gain controlling resistor 74 is connected between the inverting input and the output terminal of amplifier 76. The output of the amplifier 24 is then a voltage which is related to the voltage developed across the current transducer 22 by a constant of proportionality.

A rheostat 116 connected between the system common and the negative bus is the control available to the system operator and, in an electric vehicle, is mechanically linked to the accelerator pedal. The position of the rheostat wiper provides a reference voltage with respect to the system common that serves as an input to controlled acceleration circuit 114. The purpose of the controlled acceleration circuit is to limit the rate of increase in motor torque in order to prevent wheel slippage. The wiper of rheostat 116 is connected to one end of resistor 104. The other end of the resistor is connected to a capacitor 112, and a diode 105 is connected in shunt about resistor 104. Capacitor 112 is shunted by the emitter collector junction of a transistor 110, the collector being connected to common and the emitter to the junction between resistor 104 and the capacitor 112. The base of transistor 110 is connected through resistor 108 to a voltage which serves to reset the controlled acceleration circuit 114. When a positive voltage is applied to the base electrode of transistor 110 through resistor 108, the transistor becomes conductive and the voltage across capacitor 112 is effectively clamped to zero. An output resistor 106 has one end connected to the junction between resistor 104 and capacitor 112, with the other terminal serving as the output terminal of the controlled acceleration circuit 114.

A current proportional to the voltage across capacitor 112 is supplied from the controlled acceleration circuit 114 to the summing junction of the control operational amplifier 126. A resistor 122 is connected between the inverting input or summing junction and the output of amplifier 124 and converts the input current to a proportional output voltage. This voltage is supplied to a control circuit 128 which advantageously includes an oscillator and a commutating circuit for operating power switch 18. Ideally, the oscillator will time the turn-on gating pulses such that the mark-space ratio of the power switch is a linear function of the oscillator input voltage, in which event the voltage output of the amplifier 126 will be directly proportional to the voltage applied to the motor. An oscillator of this type is described in my co-pending U.S. patent application Ser. No. 319,526, filed Dec. 29, 1972, and entitled Controlled Variable Time Ratio Circuit.

The voltage applied to the motor terminals is now seen to be a function of the magnitude of current flowing from the summing junction (inverting input) of operational amplifier 124, which has its non-inverting input connected to the system common.

There are three sources of current in the summing junction of amplifier 124; the output current of the controlled acceleration circuit 114, the output of the current-limit circuit 96 which will be described later, and an input current from a creep adjustment network 117. The creep adjustment network supplies a reference current proportional to the torque desired with zero depression of the accelerator pedal. The input is supplied by a series circuit composed of a resistor 118 and a potentiometer 120 which can be adjusted to provide the desired current level. In the absence of a current-limit signal, the motor voltage is then determined by the combination of voltages applied by the creep adjustment circuit and the accelerator pedal rheostat 116.

The current-limit circuit 96 has no effect upon applied motor voltage unless the motor armature current has reached a preset maximum level. The output voltage of the current amplifier 24 is supplied by way of a resistor 78 to the non-inverting terminal of a comparator 82. The inverting terminal of the comparator is connected to the wiper of a potentiometer 88 which has one end connected to the positive bus, and the other end connected to the negative bus through a resistor 92. One end of the series combination of resistor 90 and potentiometer 94 is connected to the junction of potentiometer 88 and resistor 92. The other end of the series circuit functions to receive a voltage for increasing the current-limit setting of the circuit during braking, and will be described later. A gain controlling resistor 80 connects the non-inverting input to the output of comparator 82. The output terminal of comparator 82 is connected by way of diode 84 and resistor 86 to the inverting terminal of comparator 124. When the armature current is less than the predetermined limiting value the output voltage of the amplifier 24 is less than the voltage at the wiper of potentiometer 88. Comparator 82 then produces a negative output voltage which reverse biases diode 84 and thus has no effect upon the input current to amplifier 126. When the armature current exceeds the predetermined value, the voltage output of amplifier 24 exceeds the voltage set at the wiper of potentiometer 88 and the output voltage of comparator 82 switches to a positive level. Since diode 84 is now forward biased a positive current is supplied to the control amplifier 126, reducing its output voltage and effecting a reduction in the mark-space ratio of the power switch 18 which in turn reduces the current flowing through the motor armature.

During braking, two functions must be accomplished. First, the reset terminal of the controlled acceleration circuit 114 must be biased to energize transistor 110 for shunting capacitor 112, nullifying the effect of accelerator pedal position on the braking torque. Secondly, the current-limit circuit must be adjusted to provide a predetermined increase in the current-limit reference voltage, to assure adequate braking torque. Both of these functions are accomplished by the braking mode detection circuit 100 which is identical to the circuit described in connection with the preferred embodiment of FIG. 2, with the addition of capacitor 102 and diode 98. Capacitor 102 is connected in parallel with resistor 28 to filter out voltage fluctuations resulting from ripple in the armature current. Diode 98 is connected to the output of comparator 32, the cathode terminal thereof serving as the output terminal of the braking mode detection circuit. As was set forth with respect to FIG. 2, the output of comparator 32 is positive only when the motor is operating in a braking mode. The positive output voltage produced by detection circuit 100 provides an actuating signal to the reset terminal of controlled acceleration circuit 114, and also increases the maximum current allowed by current limit circuit 96 to a value which is determined by the setting of potentiometer 94.

While the foregoing description has been directed primarily to the control of a series direct current motor for use in electric vehicles, it will be immediately apparent to those skilled in the art that the present invention is not so limited, and the appended claims are therefore intended to cover the full spirit and scope of the present invention.

What is claimed as new and desired to be secured by Letters Patent of the United States is:

1. A circuit for sensing operation of a direct current motor having an armature and a field winding in a braking mode comprising:
    first sensing means for sensing the magnitude of armature current and outputting a first signal representative thereof;
    second sensing means for outputting a second signal representative of motor terminal voltage;
    output means responsive to said first and said second signals to produce an output signal when the ratio of armature current to motor terminal voltage attains a predetermined value.

2. A braking-mode detection circuit for use with a time-ratio control system for controlling operation of a direct current motor having a field winding and an armature winding comprising:
    first sensing means for producing a signal representative of armature current;
    second sensing means for producing a signal representative of the average conductivity of the time-ratio control system;
    output means coupled to said first and said second sensing means and operative to produce a signal for modifying the operation of said time ratio control system when said signals produced by said first and said second sensing means achieve a predetermined relationship.

3. The invention defined in claim 2, wherein said output means serves to lessen the average conductivity of the time ratio control system for reducing the voltage applied to the DC motor.

4. In an electric vehicle powered by a direct current traction motor having an armature winding and a field winding, means for reversibly connecting the field winding to effect motor braking, the operation of said traction motor being controlled by a time-ratio control system comprising power switching means and means for modifying the mark-space conductive ratio of the power switching means, a braking mode detection circuit comprising:
 first means coupled to said armature for producing a first signal proportional to armature current;
 second means coupled to said control system for producing a second signal proportional to the mark-space ratio of said power switch; and
 output means coupled to said first and said second means and operative to decrease the mark-space ratio of said power switching means when said first and said second signals achieve a predetermined ratio.

5. The invention defined in claim 4 wherein said output means comprises a comparator.

6. The invention defined in claim 5 wherein said first sensing means comprises a resistive current shunt coupled in circuit with said armature.

7. In a control circuit including a gated switch for controllably metering power to a DC motor having an armature and a field winding, means for indicating the operation of the motor in the braking mode, comprising:
 first means for producing a first signal indicative of the magnitude of the armature current;
 second means for producing a second signal indicative of the conduction to non-conduction time ratio of the gated switch;
 means coupled to said first and said second means for receiving said first and said second signals and producing an output signal when said first and said second signals exceed predetermined values.

8. The invention defined in claim 7, further including utilization means coupled to said last-named means for reducing the conduction to non-conduction time ratio of the gated switch upon receipt of said output signal.

9. The invention defined in claim 8, wherein said first means is a resistive current shunt.

10. In a control circuit including gated thyristor means for metering power to a DC motor having an armature and a field winding, means for controlling the amount of power so metered during motor braking comprising:
 control means for gating the thyristor means to effect a predetermined mark-space ratio;
 first means adapted to be coupled to the armature for producing a signal indicative of the current flowing therethrough;
 second means producing a signal indicative of the mark-space ratio of the gated thyristor means;
 output means coupled to said first and said second means for producing an output signal when both the armature current and the average conductivity exceed predetermined values; and
 means coupling said output signal to said control means for changing the mark-space ratio of the gated thyristor means.

11. The invention defined in claim 10, wherein the gated thyristor means is an SCR.

12. The invention efined in claim 11, wherein said control means is a voltage-controlled oscillator.

13. The invention defined in claim 12, wherein said means for producing a signal indicative of armature current comprises a current shunt.

14. In a control system for a direct current motor having an armature and a field winding, comprising a switchable thyristor device adapted to be coupled between the motor and a source of direct current power and control means for controlling the mark-space conduction ratio of the thyristor device;
 means for producing a first signal representative of the magnitude of current through the motor armature;
 means for producing a second signal representative of the average voltage applied to the motor by the thyristor device;
 means for limiting the mark-space ratio of said thyristor device to a predetermined value; and
 means for energizing said last-named means when said first and said second signal exceed first and second reference values, respectively.

15. In a direct current motor control system for coupling a direct current motor including an armature and a field winding across a source of direct current power, and including a gated semiconductor switch and an oscillator circuit for controlling the mark-space ratio of the switch;
 first output means for providing a first output signal proportional to armature current;
 second output means for providing a second output signal proportional to the average voltage applied across the motor;
 current limit means for comparing said first signal with a reference and outputting a current limit signal when said first signal exceeds said reference;
 braking signal means coupled to said first and said second output means for producing a braking signal when said first and said second output signals exceed predetermined reference values; and
 means coupled to said current limit means and said braking signal means and responsive to said current limit signal or said braking signal for limiting the mark-space ratio of the gated semiconductor switch to a predetermined maximum value.

16. The invention defined in claim 15, further including means coupled to said current limit means and to said braking signal means for changing the effective value of said current limit means reference when said second output signal exceeds a predetermined value.

17. The invention defined in claim 16, wherein said gated semiconductor switch is an SCR.

18. The invention defined in claim 17, wherein said first output means includes a resistive current shunt coupled in circuit with the motor armature.

19. The invention defined in claim 18, wherein said current limit means reference signal is changed from a first, lower value to a second, higher value in the presence of said second output signal.

* * * * *